US012259689B2

(12) United States Patent
Helfer et al.

(10) Patent No.: US 12,259,689 B2
(45) Date of Patent: Mar. 25, 2025

(54) ROTARY WHEEL SET SYSTEM OF A HOROLOGICAL MOVEMENT

(71) Applicant: ETA SA Manufacture Horlogère Suisse, Grenchen (CH)

(72) Inventors: Jean-Luc Helfer, Le Landeron (CH); Dominique Lechot, Les Reussilles (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 966 days.

(21) Appl. No.: 17/338,126

(22) Filed: Jun. 3, 2021

(65) Prior Publication Data

US 2021/0405588 A1 Dec. 30, 2021

(30) Foreign Application Priority Data

Jun. 26, 2020 (EP) .................................... 20182671

(51) Int. Cl.
*G04B 31/04* (2006.01)
*G04B 1/16* (2006.01)

(52) U.S. Cl.
CPC ............... *G04B 31/04* (2013.01); *G04B 1/16* (2013.01)

(58) Field of Classification Search
CPC ........... G04B 1/16; G04B 31/00; G04B 31/04
See application file for complete search history.

(56) References Cited

U.S. PATENT DOCUMENTS 3,942,848 A 3/1976 Voumard
7,344,303 B2 * 3/2008 Conus .................... G04B 31/04 368/324
8,702,301 B2 * 4/2014 Hiraoka ................. G04B 17/06 368/324

(Continued)

FOREIGN PATENT DOCUMENTS

CH 707 501 A2 7/2014
CH 715 419 A2 4/2020

(Continued)

OTHER PUBLICATIONS

Combined Chinese Office Action and Search Report issued Jan. 28, 2023 in Chinese Patent Application No. 202110708428.1 (with English translation of Categories of Cited Documents), 10 pages.

(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A rotary wheel set system of a horological movement with a rotary wheel set a first and a second bearing for a first and a second pivot of the arbor of the rotary wheel set, the wheel set including a mass center in a position of its arbor, the first bearing including an endstone including a main body equipped with a conical cavity configured to receive the first pivot of the arbor of the rotary wheel set, the first pivot being capable of cooperating with the cavity of the endstone to rotate in the cavity, at least one contact zone between the first pivot and the cavity being generated, the normals of the contact zone forming a minimum contact angle relating to the plane perpendicular to the arbor of the pivot, the minimum contact angle being less than or equal to 30°, preferably less than or equal to arctan (½).

17 Claims, 5 Drawing Sheets

(56) References Cited

U.S. PATENT DOCUMENTS

| | | | | |
|---|---|---|---|---|
| 8,926,170 | B2 * | 1/2015 | Helfer | G04B 31/02<br>368/326 |
| 9,235,191 | B2 * | 1/2016 | Stranczl | G04B 35/00 |
| 9,690,256 | B2 * | 6/2017 | Zaugg | F16C 27/02 |
| 10,012,955 | B2 * | 7/2018 | Born | G04B 31/06 |
| 11,886,151 | B2 * | 1/2024 | Helfer | G04B 31/0082 |
| 2011/0164478 | A1 * | 7/2011 | Conus | G04B 31/0082<br>368/324 |
| 2013/0188462 | A1 | 7/2013 | Helfer et al. | |
| 2014/0341005 | A1 * | 11/2014 | Hessler | G04B 31/02<br>216/41 |

FOREIGN PATENT DOCUMENTS

| | | | |
|---|---|---|---|
| CN | 103988133 | A | 8/2014 |
| CN | 107402511 | A | 11/2017 |
| EP | 1 986 059 | A1 | 10/2008 |
| EP | 3 671 368 | A1 | 6/2020 |
| JP | 48-4508 | | 2/1973 |

OTHER PUBLICATIONS

Combined Chinese Office Action and Search Report issued Jul. 25, 2022 in Chinese Patent Application No. 202110708428.1, 10 pages.
Korean Office Action issued Nov. 15, 2023 in Korean Application 10-2021-0078547, (with English translation), 17 pages.
European Search Report issued Nov. 23, 2020 in European Application 20182671.6 filed Jun. 26, 2020 (with English Translation of Categories of Cited Documents), 3 pages.

* cited by examiner

ROTARY WHEEL SET SYSTEM OF A HOROLOGICAL MOVEMENT

CROSS-REFERENCE TO RELATED APPLICATION

This application claims priority to European Patent Application No. 20182671.6 filed on Jun. 26, 2020, the entire disclosure of which is hereby incorporated herein by reference.

FIELD OF THE INVENTION

The present invention relates to a rotary wheel set system of a horological movement, particularly a resonator mechanism. The invention also relates to a horological movement equipped with such a wheel set system.

BACKGROUND OF THE INVENTION

In horological movements, the arbors of rotary wheel sets generally have pivots at their ends, which rotate in bearings mounted in the plate or in the bridges of a horological movement. For some wheel sets, in particular the balance, it is customary to equip the bearings with a shock-absorber mechanism. Indeed, as the pivots of the arbor of a balance are generally thin and the mass of the balance is relatively high, the pivots may break under the effect of a shock in the absence of shock-absorber mechanism.

The configuration of a conventional shock-absorber bearing 1 is represented in FIG. 1. An olive domed jewel 2 is driven in a bearing support 3 commonly known as setting, whereon is mounted an endstone 4. The setting 3 is held pressed against the back of a bearing-block 5 by a shock-absorber spring 6 arranged to exert an axial stress on the upper portion of the endstone 4. The setting 3 further includes an outer conical wall arranged in correspondence with an inner conical wall disposed at the periphery of the back of the bearing-block 5. Variants also exist according to which the setting includes an outer wall having a convex-shaped, that is to say domed, surface.

However, the friction torque on the arbor due to the weight of the wheel set varies depending on the orientation of the wheel set in relation to the direction of gravity. These variations of the friction torque may particularly result in a variation of the oscillation amplitude for the balance. Indeed, when the arbor of the wheel set is perpendicular to the direction of gravity, the weight of the wheel set rests on the jewel hole, and the friction force produced by the weight has a lever arm in relation to the arbor, which is equal to the radius of the pivot. When the arbor of the wheel set is parallel with the direction of gravity, it is the tip of the pivot on which the weight of the wheel set rests. In this case, if the tip of the pivot is rounded, the friction force produced by the weight is applied on the axis of rotation, and therefore has a zero lever arm in relation to the axis. These lever arm differences produce the friction torque differences, which may also generate rate differences if the isochronism is not perfect.

In order to control this problem, another configuration of shock-absorber bearing was devised, partially represented in FIG. 2. The bearing includes an endstone 7 of cup-bearing type, comprising a cone-shaped cavity 8 for receiving a pivot 12 of the arbor 9 of the rotary wheel set, the back of the cavity being formed by the apex 11 of the cone. The pivot 12 is also conical for insertion into the cavity 8, but the solid angle of the pivot 12 is smaller than that of the cone of the cavity 8. This configuration makes it possible to render almost zero the lever arm of the friction force in all orientations in relation to gravity, by assuming that the pivot 12 always remains properly centred in the cavity 8. For this, in general it is necessary to pre-stress the system, for example with a bearing mounted on a spring, which permanently rests on the pivot. Nevertheless, this spring adds to the weight of the wheel set, and increases the frictions. In addition, it is difficult to guarantee a good surface condition of the backs of the cavity, because it is difficult to access via polishing means.

SUMMARY OF THE INVENTION

Consequently, one aim of the invention is to propose a wheel set system of a horological movement that prevents the aforementioned problem.

To this end, the invention relates to a wheel set system comprising a rotary wheel set, for example a balance, a first and a second bearing, particularly shock-absorbers, for a first and a second pivot of the arbor of the rotary wheel set, the system including a mass centre in a position of its arbor, the first bearing including an endstone comprising a main body equipped with a conical cavity configured to receive the first pivot of the arbor of the rotary wheel set, the first pivot being capable of cooperating with the cavity of the endstone in order to be able to rotate in the cavity, at least one contact zone between the first pivot and the cavity being generated, the normals of the contact zone forming a minimum contact angle relating to the plane perpendicular to the arbor of the pivot.

The system is remarkable in that the minimum contact angle is less than or equal to 30°, preferably less than or equal to arctan(½), which is substantially equal to 26.6°.

Thanks to the invention, the friction variation between the horizontal and vertical positions in relation to gravity are reduced. By selecting a minimum contact angle less than or equal to 30°, or even less than or equal to arctan(½), the friction torque due to the weight at the contact between the pivots and the cavities of the bearings is substantially the same regardless of the direction of gravity. Indeed, such an angle makes it possible to compensate the contact force variations due to the orientation change in relation to gravity by the different lever arms of the friction force on the two bearings.

Thus, this configuration of the endstone makes it possible to keep a low variation of the friction torque of the pivots inside the endstones, regardless of the position of the arbor in relation to the direction of gravity, which is for example important for a balance arbor of a movement of a timepiece. The cone shape of the cavity, as well as that of the pivot minimise the friction torque difference between the various positions of the arbor in relation to the direction of gravity.

According to an advantageous embodiment, the second bearing cooperates with the second pivot to make it possible for the rotary wheel set to rotate about its arbor, the second bearing comprising a second cavity, the second pivot being capable of cooperating with the second cavity of the endstone in order to be able to rotate in the second cavity, at least one second contact zone between the second pivot and the second cavity being generated, the normals of the second contact zone forming a minimum contact angle in relation to the plane perpendicular to the arbor of the second pivot, the minimum contact angles of the two pivots and of the two bearings being defined by the following equation: $\cot\alpha_h+\cot\alpha_b\geq 2.5$, preferably $\cot\alpha_h+\cot\alpha_h\geq 3$, or even $\cot\alpha_h+\cot\alpha_h\geq 4$.

According to an advantageous embodiment, the second minimum contact angle $\alpha_b$ is greater than or equal to arctan(½).

According to an advantageous embodiment, the minimum contact angles ($\alpha_b$, $\alpha_h$) are defined by the following equations:

$$\tan\alpha_b = \frac{\overline{BH}}{4\overline{GH}}$$

$$\tan\alpha_h = \frac{\overline{BH}}{4\overline{GB}}$$

$$\frac{R_h}{R_b} = \frac{\mu_b}{\mu_h}\frac{\overline{GH}}{\overline{GB}}$$

where BH is the distance between the ends of the two pivots, GH is the distance between the end of the first pivot in contact with the first bearing and the mass centre of the balance, and GB is the distance between the end of the second pivot in contact with the second bearing and the mass centre of the balance.

According to another advantageous embodiment, the minimum contact angles ($\alpha_b$, $\alpha_h$) are defined by the following equations:

if GB<GH:

$$\tan\alpha_b = \frac{1}{\frac{2\overline{GH}}{\overline{BH}}\sqrt{\left(1+\frac{2\overline{GH}}{\overline{BH}}\right)\left(1+\frac{2\overline{GB}}{\overline{BH}}\right)}}$$

$$\tan\alpha_h = \frac{1}{\sqrt{\left(1+\frac{2\overline{GH}}{\overline{BH}}\right)\left(1+\frac{2\overline{GB}}{\overline{BH}}\right)}}$$

if GB>GH:

$$\tan\alpha_b = \frac{1}{\sqrt{\left(1+\frac{2\overline{GH}}{\overline{BH}}\right)\left(1+\frac{2\overline{GB}}{\overline{BH}}\right)}}$$

$$\tan\alpha_h = \frac{1}{\frac{2\overline{GB}}{\overline{BH}}\sqrt{\left(1+\frac{2\overline{GH}}{\overline{BH}}\right)\left(1+\frac{2\overline{GB}}{\overline{BH}}\right)}}$$

where BH is the distance between the ends of the two pivots, GH is the distance between the end of the first pivot in contact with the first bearing and the mass centre of the balance, and GB is the distance between the end of the second pivot in contact with the second bearing and the mass centre of the balance.

According to another advantageous embodiment, the contact zone or zones go around the pivot and the cavity about the arbor of the balance.

According to an advantageous embodiment, the first pivot has a conical shape.

According to an advantageous embodiment, the first pivot has a convex portion and the cavity has a concave portion, a section of each portion forming the contact zone.

According to an advantageous embodiment, the first pivot has a concave portion and the cavity has a convex portion, a section of each portion forming the contact zone.

According to an advantageous embodiment, the first pivot has a convex portion and the cavity has a convex portion, a section of each portion forming the contact zone.

According to an advantageous embodiment, the two minimum contact angles are equal.

According to an advantageous embodiment, the end of the pivot is defined by the intersection between the normal at the contact and the arbor of the pivot.

According to an advantageous embodiment, the pivots have a rounded tip.

According to an advantageous embodiment, the rounded tips of the two pivots have identical radii.

The invention also relates to a horological movement comprising a plate and at least one bridge, said plate and/or the bridge including such a wheel set system.

SUMMARY DESCRIPTION OF THE DRAWINGS

Other features and advantages of the present invention will become apparent upon reading a plurality of embodiments given only by way of non-limiting examples, with reference to the appended drawings wherein:

FIG. 1 represents a transverse section of a shock-absorber holder bearing for an arbor of a rotary wheel set according to a first embodiment of the prior art;

FIG. 2 schematically represents an endstone of a bearing and a pivot of an arbor of a rotary wheel set according to a second embodiment of the prior art;

Figure 6:
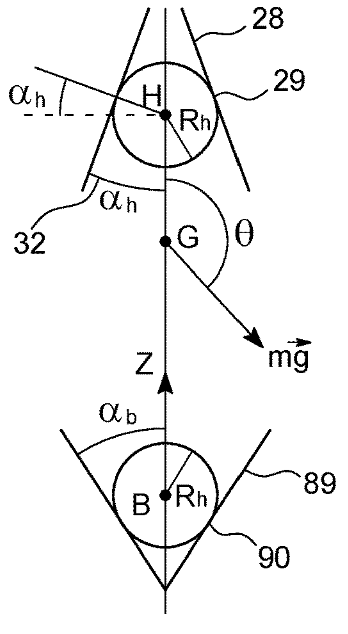
Figure 7:
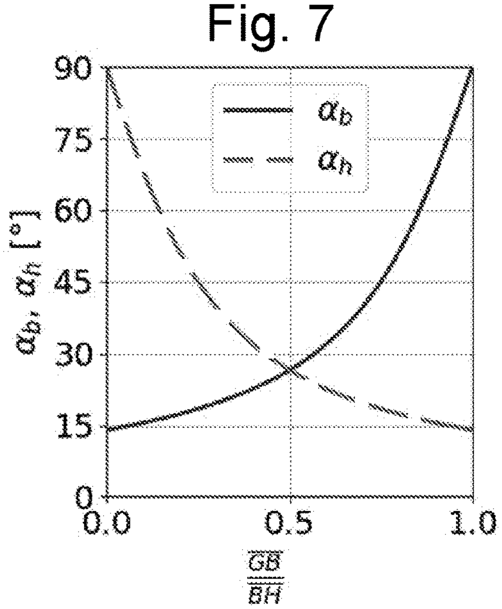
Figure 8:
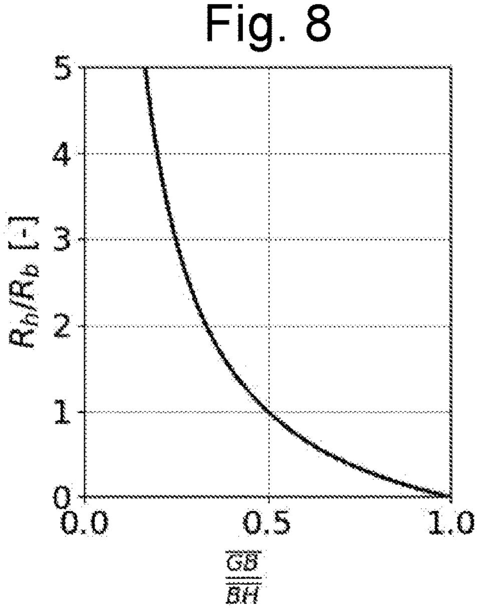
Figure 9:
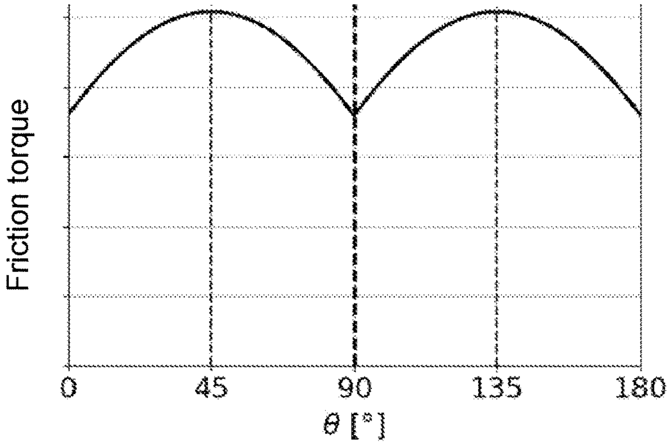

FIG. 6 schematically represents a model of the bearings and of the pivots of a rotary wheel set system according to the first embodiment of the invention;

FIG. 7 is a graph showing the optimum contact angles for the two bearings and pivots for each position of the mass centre on the arbor of the balance in a first configuration, FIG. 8 is a graph showing the difference of the optimum radii of the ends of the two pivots depending on the position of the mass centre FIG. 9 is a graph showing the friction torque variation depending on the orientation θ.

Figure 10:
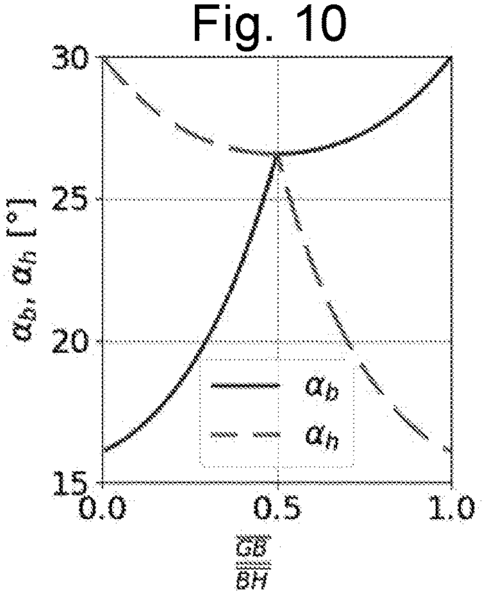
Figure 11:
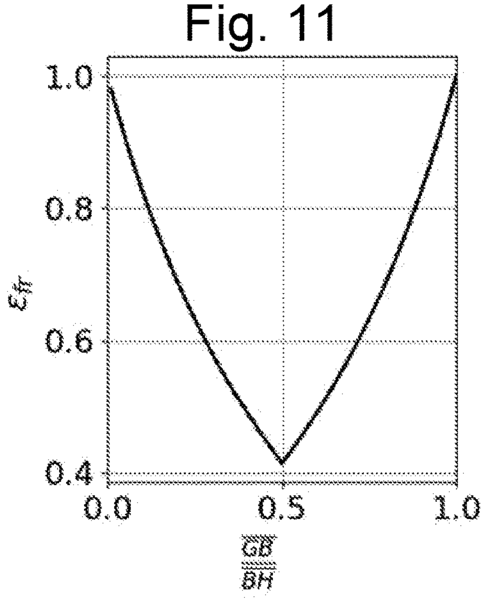
Figure 12:
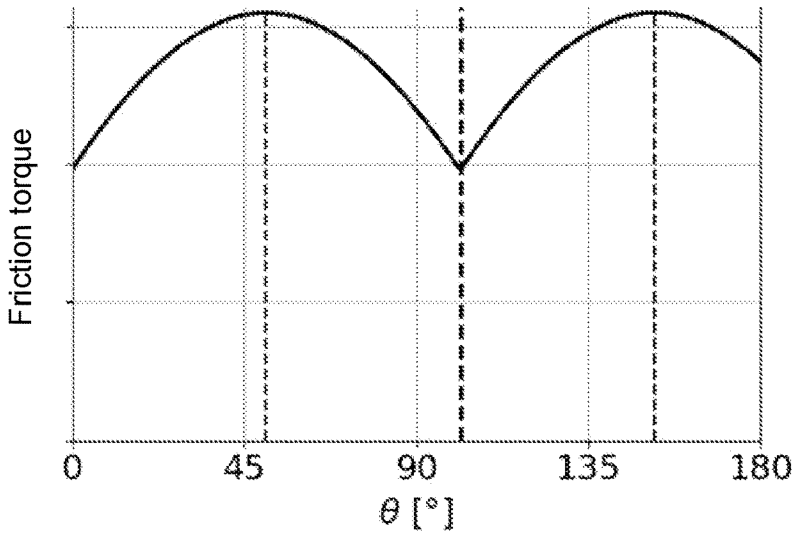
Figure 13:
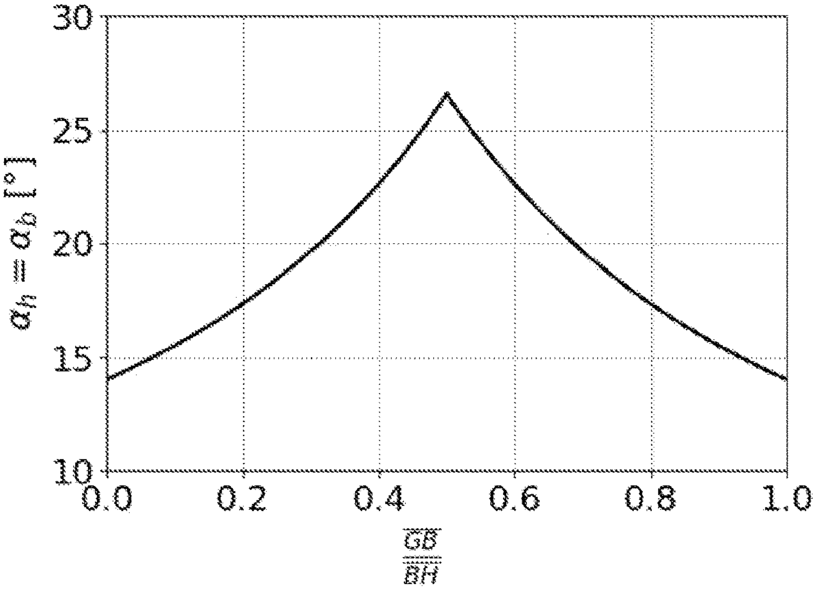
Figure 14:
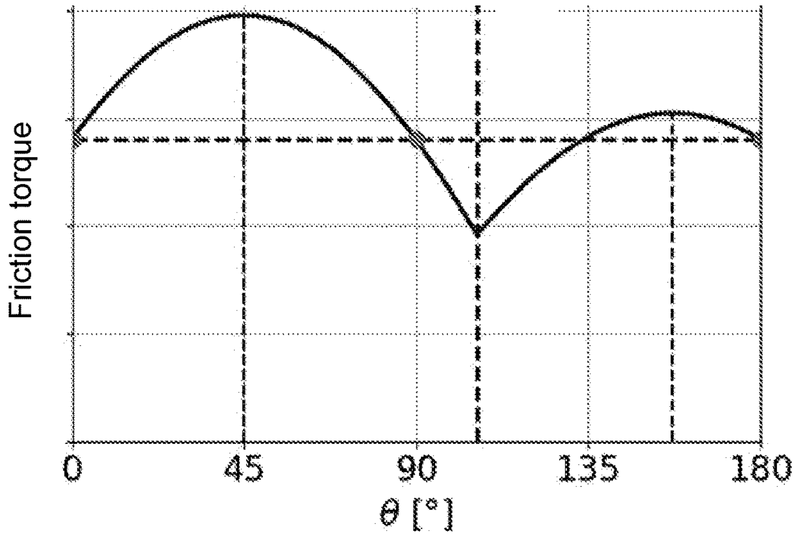
Figure 15:
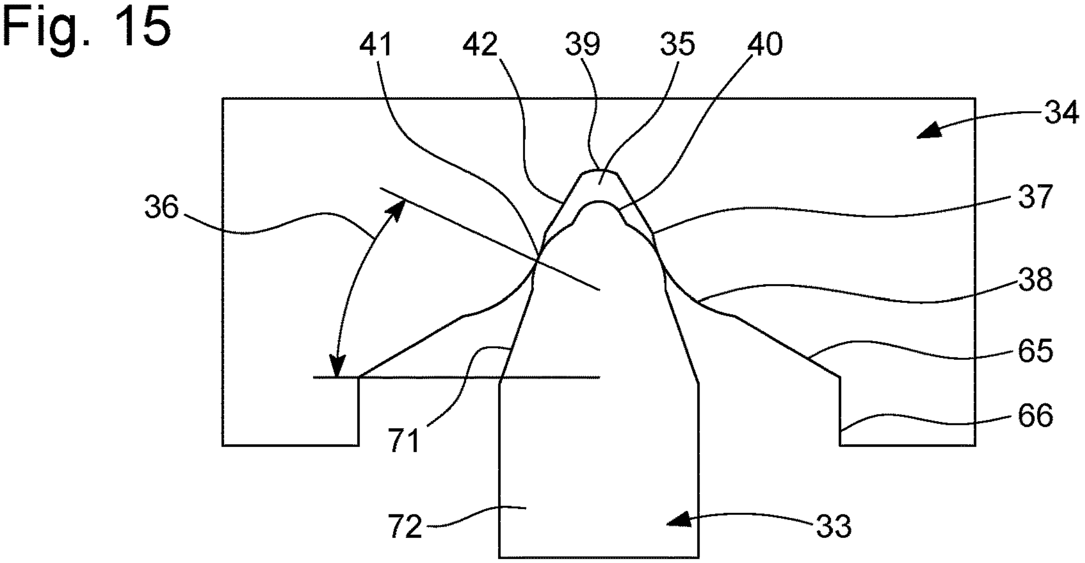
Figure 16:
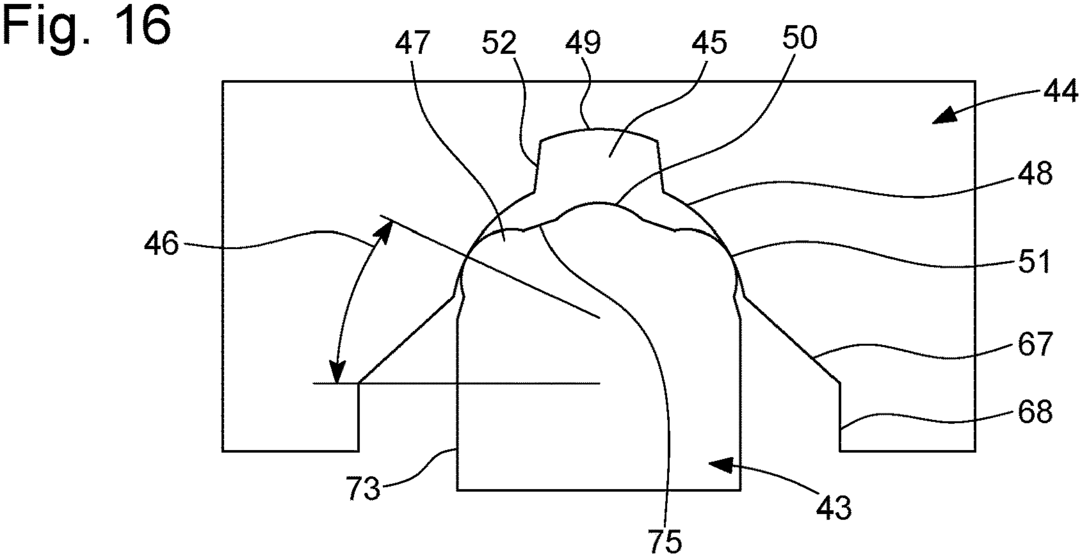
Figure 17:
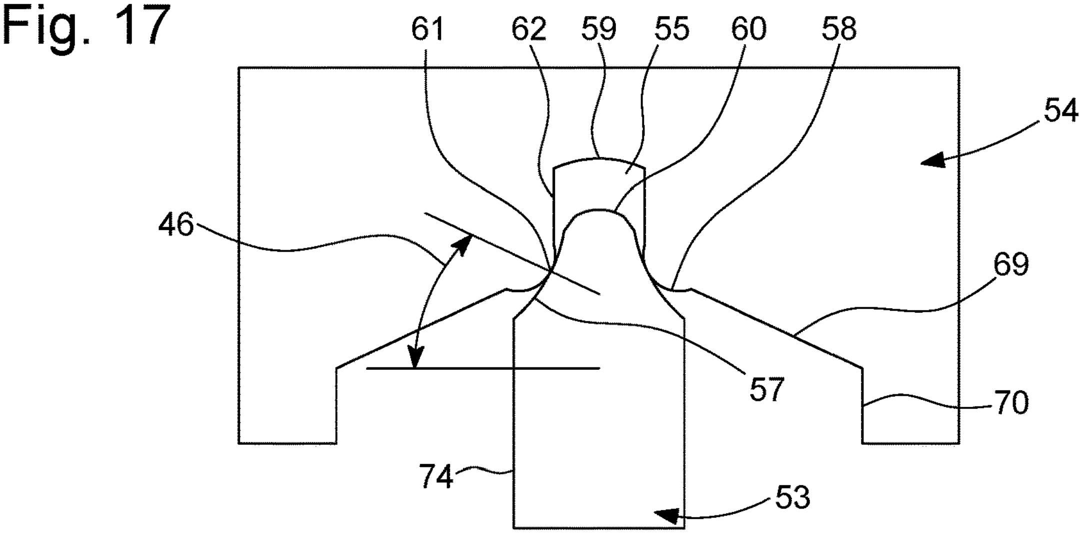

FIG. 10 is a graph showing how the optimum angles vary depending on the relative position of the mass centre, in a second configuration where the ends of the pivots are identical, FIG. 11 is a graph showing the variation of ε depending on the relative position of the mass centre for the second configuration, FIG. 12 is a graph showing the friction torque variation depending on the orientation θ for the second configuration, FIG. 13 is a graph showing the variation of the optimum angles depending on the relative position of the mass centre for a third configuration, and FIG. 14 is a graph showing the friction torque variation depending on the orientation θ for the third configuration, FIG. 15 schematically represents an enlarged view of a bearing and of a pivot of a rotary wheel set system according to a second embodiment of the invention;

FIG. 16 schematically represents an enlarged view of a bearing and of a pivot of a rotary wheel set system according to a third embodiment of the invention; and FIG. 17 schematically represents an enlarged view of a bearing and of a pivot of a rotary wheel set systems according to a fourth embodiment of the invention

DETAILED DESCRIPTION OF PREFERRED EMBODIMENTS

In the description, the same numbers are used to designate identical objects. In a horological movement, the bearing is used to hold an arbor of a rotary wheel set, for example a balance arbor, by making it possible for it to perform rotations about its arbor. The horological movement generally comprises a plate and at least one bridge, not represented in the figures, said plate and/or the bridge including an orifice, the movement further comprising a rotary wheel set and a bearing inserted into the orifice.

Figure 1:
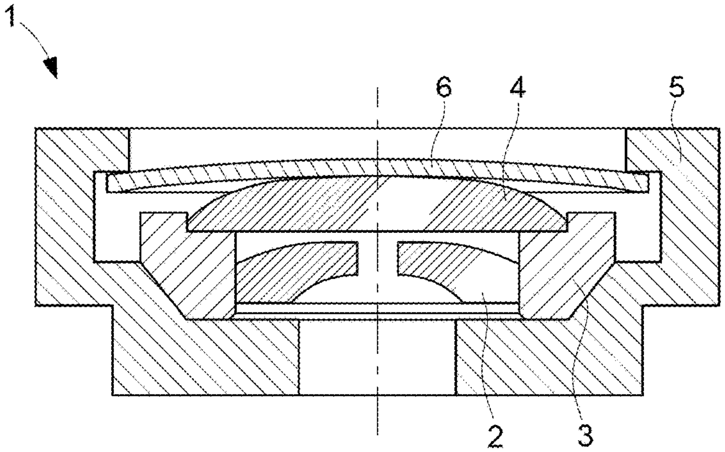
Fig. 1 PRIOR ART
Figure 2:
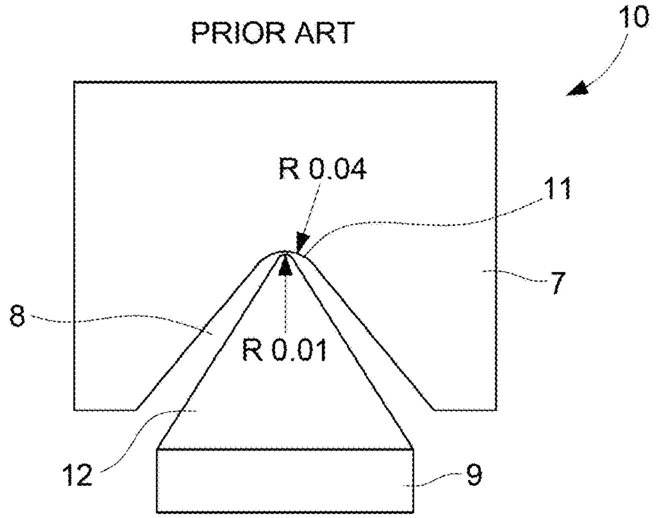
Fig. 2 PRIOR ART
Figure 3:
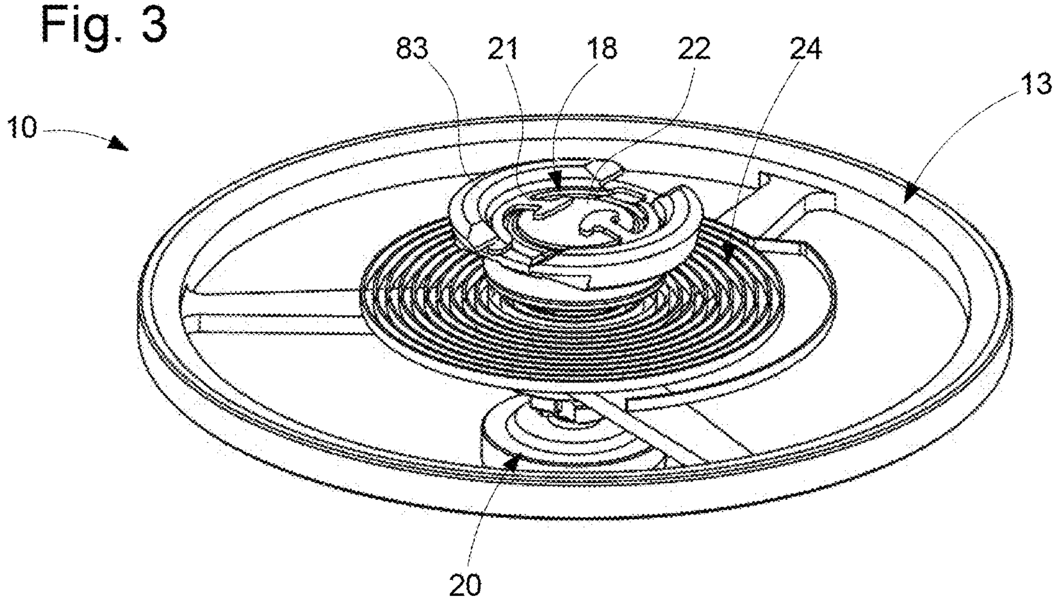
FIG. 3 represents a perspective view of a rotary wheel set system, here a resonator mechanism comprising a rotary wheel set, such as a balance, according to a first embodiment of the invention.
Figure 4:
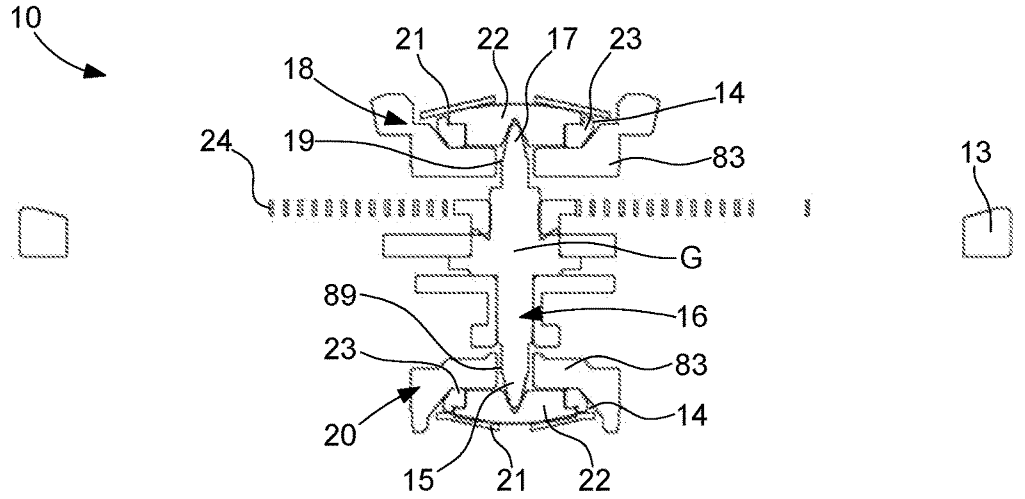
FIG. 4 represents a sectional view of the rotary wheel set system according to FIG. 3.

FIGS. 3 and 4 show a rotary wheel set system equipped with a balance 13 and a hairspring 24, the balance 13 including an arbor 16. The arbor 16 comprises a pivot 15, 17 at each end. Each bearing 18, 20 includes a cylindrical bearing-block 83 equipped with a bed 14, an endstone 22 arranged in the bed 14, and an opening 19 operated in a face of the bearing 18, 20, the opening 19 leaving a passage for inserting the pivot 15, 17 into the bearing up to the endstone 22. The endstone 22 is mounted on a bearing support 23 and comprises a main body equipped with a cavity configured to receive the pivot 15, 17 of the arbor 16 of the rotary wheel set. The pivots 15, 17 of the arbor 16 are inserted into the bed 14, the arbor 16 being held while being able to rotate for making possible the movement of the rotary wheel set.

The two bearings 18, 20 are shock-absorbers, and in addition comprise an elastic support 21 of the endstone 22 to damp the shocks and to prevent the arbor 16 from breaking. An elastic support 21 is for example a flat spring with axial deformation whereon the endstone 22 is assembled. The elastic support 21 is slotted into the bed 14 of the bearing-block 83 and it holds the endstone 22 in the bed 14. Thus, when the timepiece undergoes a violent shock, the elastic support 21 absorbs the shock and protects the arbor 16 of the rotary wheel set.

Figure 5:
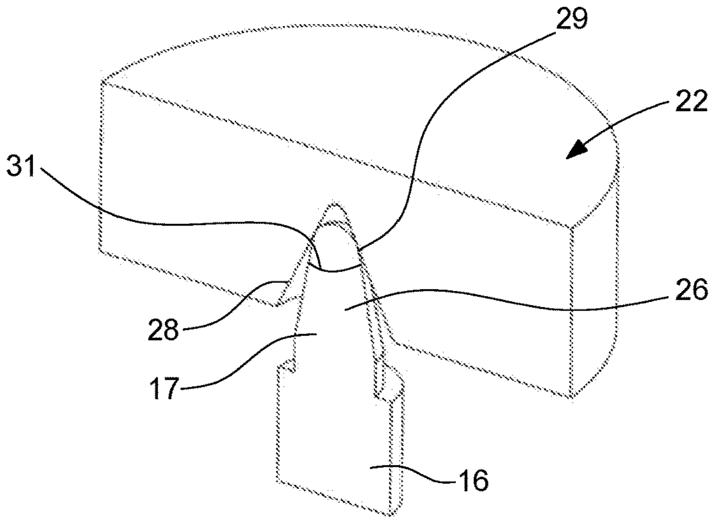
FIG. 5 represents a pivot and a bearing according to the first embodiment of the invention.

In a first embodiment of FIGS. 5 and 6, the pivot 15, 17 has a shape of substantially circular first cone 26 having a first opening angle 31. The opening angle 31 is the half-angle formed inside the cone by its outer wall.

The cavity 28 of the endstone 22 has a shape of second cone having a second opening angle 32 at the apex. In order for the pivot 15, 17 to be able to rotate in the cavity, the second opening angle 32 is greater than the first opening angle 31 of the first cone 26.

The pivot 15, 17 and the cavities 28 cooperate to form a contact zone 29. The contact zone 29 is defined by the portions of the second cone and of the pivot 15, 17 that are in contact. The contact zone 29 goes around the pivot 15, 17 and the cavity 28.

The normals at the contact zone 29 are straight lines perpendicular to the contact zone 29. The normals form a minimum angle, known as minimum contact angle, in relation to the plane perpendicular to the arbor of the pivot.

According to the invention, the minimum contact angle is less than or equal to 30°, preferably less than or equal to arctan(½).

In this first embodiment where the cavity 28 and the pivots 15, 17 are conical, the normal corresponds to the straight line perpendicular to the wall of the second cone, that is to say the cone of the cavity 28. Thus, the minimum contact angle is equivalent to the half-opening angle of the second cone of the cavity 28. In order for the minimum contact angle to be less than or equal to 30°, or even less than or equal to arctan(½), in relation to the plane perpendicular to the pivot, the second angle of the second cone must be less than or equal to 60°, or even less than or equal to 2*arctan (½)=53.13°.

These angle values are calculated from equations modelling the frictions of the pivots and of the bearings. In order to be able to describe the formulas that give the optimum angles, the following geometric variables are defined, sketched in FIG. 6:

- $\alpha_b$ and $\alpha_h$ are the angles between the generatrices of the cones and the axis of symmetry of the cones, for the bearing of the bottom and that of the top;
- $R_b$ and $R_h$ are the radii of the spherical domes of the tips of the pivots at the bottom and at the top of the arbor of the balance;
- B and H are the centres of the spherical domes of the tips of the pivots at the bottom and at the top of the arbor of the balance;
- G is the position of the mass centre, assumed on the straight line BH (balanced balance);
- $\mu_b$ et $\mu_h$ are the friction coefficients at the bottom and at the top.

In order to evaluate the friction difference depending on gravity, two sets of orientation and two types of stresses applied on the geometry of the wheel set system are distinguished:

- the two sets of orientation are the following:
  - $O_1$: the angle θ between the arbor of the balance and the gravity travels along the entire space [0°, 180°],
  - $O_2$: the angle θ between the arbor of the balance and the gravity travels along the 3 isolated values 0°, 90° and 180°,
- the two types of stresses on the geometry are the following:
  - $C_1$: no stress on the radii $R_b$ and $R_h$ and the angles $\alpha_b$ and $\alpha_h$,
  - $C_2$: for ease of manufacturing issues, it is imposed $R_b=R_h$, and it is assumed $\mu_b=\mu_h$, It is designated by $M_{fr,max}$, respectively $M_{fr,min}$, the maximum, respectively minimum, friction torque, on all of the angles θ considered (either the entire space [0°, 180°] in the case of $O_1$, or the 3 values 0°, 90° and 180° in the case of $O_2$). It is desired to minimise the maximum relative torque variation, defined by $$\varepsilon = \frac{M_{fr,max} - M_{fr,min}}{M_{fr,min}}$$

In the case O1, for a rotary wheel set arbor equipped with two pivots, as illustrated in FIG. 6, the optimum minimum contact angle (α) between the pivot-bearing pairs is defined by the following equations:

$$\tan\alpha_b = \frac{\overline{BH}}{4\overline{GH}}$$

-continued $$\tan\alpha_h = \frac{\overline{BH}}{4\overline{GB}}$$

$$\frac{R_h}{R_b} = \frac{\mu_b}{\mu_h}\frac{\overline{GH}}{\overline{GB}}$$

where BH is the distance between the ends of the two pivots 15, 17, and GH is the distance between the end of the pivot 15, 17 and the mass centre G of the balance 2.

These equations are from a three-dimensional model of the contact between the pivot and the endstone, wherein the end of the pivot is modelled by a sphere. In the general case, B and H are defined by the intersection between the normal at the contact and the arbor of the pivot. Preferably, the tips of the pivots are rounded, B and H being defined by the centre of the sphere. Thus, the radius of the rounded tip corresponds to the segment between the contact and the intersection of the normal at the contact and of the arbor of the pivot 15, 17.

This relation applies to pivots having different shapes. The radii $R_b$ and $R_h$ of the rounded tips may be different from one another.

Thus, according to the position of the mass centre G, the first cones of the two pivots 15, 17 may have different opening angles. But if they meet this relation, the friction variation between the vertical and horizontal positions is reduced in relation to other geometries of pivots and of cavities. In this case, the relative torque variation ε is of 41%.

These relations are also suitable for the set $O_2$ of the three positions of the angle θ between the arbor of the balance and the gravity (0°, 90° and 180° with a zero variation, where ε=0%.

The graph of FIG. 7 shows the optimum contact angles for the two bearings and pivots for each position of the mass centre on the arbor of the balance. The particular case where the mass centre G is in the middle of B and H, and if the friction coefficients are equal between the bottom and the top, then we have symmetrical bearings ($R_b$=$R_b$), with $\alpha_b$ and $\alpha_h$=arctan(½)=approx. 26.6°. Thus, the desirable opening angle for cones is approximately 53.2°. In the other cases, the contact angles of the two bearing-pivot pairs are different. Thus it is noted that there is always one of the two contact angles with a value less than or equal to arctan(½) and the other angle with a value greater than or equal to arctan(½). Another case where the mass centre is located at one third of the length of the arbor of a first pivot, the optimum contact angle of this first pivot is 45°, whereas the second pivot has an optimum contact angle equal to arctan (⅓)=18.435°. Thus for the conical cavities, there is a cone of opening angle equal to 90°, and the other cone of opening angle equal to 2*arctan(⅓)=28.07°.

Each optimum contact angle is within a space ranging from 14° to 90°. The smallest contact angle is that of the pivot the closest to the mass centre.

The graph of FIG. 8 shows the difference of the optimum radii of the ends of the two pivots depending on the position of the mass centre. Thus, it is noted that for a mass centre in the middle of the balance arbor, the radii are preferably equal for the two ends.

An example of friction torque variation depending on the orientation θ is shown on Graph 9. The curve is symmetrical in relation to the 90° position. The torque increases progressively from 0 to 45°, then reduces from 45° to 90°, increases again from 90° to 135°, and reduces from 135° to 180°. This variation curve is the same regardless of the optimum case, to the nearest scaling factor.

In a second embodiment of the modelling of the wheel set system, where the two pivots have shapes identical to those of the first model, the minimum contact angle is defined in two distinct cases by the following equations:

if GB<GH:

$$\tan\alpha_b = \frac{1}{\frac{2\overline{GH}}{\overline{BH}}\sqrt{\left(1+\frac{2\overline{GH}}{\overline{BH}}\right)\left(1+\frac{2\overline{GB}}{\overline{BH}}\right)}}$$

$$\tan\alpha_h = \frac{1}{\sqrt{\left(1+\frac{2\overline{GH}}{\overline{BH}}\right)\left(1+\frac{2\overline{GB}}{\overline{BH}}\right)}}$$

if GB>GH:

$$\tan\alpha_b = \frac{1}{\sqrt{\left(1+\frac{2\overline{GH}}{\overline{BH}}\right)\left(1+\frac{2\overline{GB}}{\overline{BH}}\right)}}$$

$$\tan\alpha_h = \frac{1}{\frac{2\overline{GB}}{\overline{BH}}\sqrt{\left(1+\frac{2\overline{GH}}{\overline{BH}}\right)\left(1+\frac{2\overline{GB}}{\overline{BH}}\right)}}$$

where BH is the distance between the ends of the two pivots, GB and GH are the distance between an end of the pivot and the mass centre of the balance. The three-dimensional model of the contact between the pivot and the endstone further includes the principle that the two pivots have the same shape, in particular for the rounded tip of the pivot of similar radius $R_b$=$R_h$.

The graphs of FIGS. 10 and 11 show how the optimum angles vary and the variation ε depending on the relative position of the mass centre. In addition, in this case, there is always one of the two angles with a value less than or equal to arctan(½) and the other angle with a value greater than or equal to arctan(½). The particular case where the mass centre G is in the middle of B and H, and if the friction coefficients are equal between the bottom and the top, then we have bearings with $\alpha_b$ and $\alpha_b$=arctan(½)=26.6° approximately.

An example of torque variation depending on the orientation θ is represented in FIG. 12. In this case, the curve is symmetrical for a value greater than 90°. Thus, for pivots of same shape and of same radii, the point of symmetry of the curve is offset in relation to that at 90° of the first embodiment.

For the case $O_2$ (0°, 90°, 180°) with $C_2$ ($R_b$=$R_h$, $\alpha_h$=$\alpha_h$), two distinct cases are obtained:

if GB<GH:

$$\tan\alpha_b = \tan\alpha_h = \frac{\overline{BH}}{4\overline{GH}}$$

if GB>GH:

$$\tan\alpha_b = \tan\alpha_h = \frac{\overline{BH}}{4\overline{GB}}$$

where BH is the distance between the ends of the two pivots, GB and GH are the distance between an end of the pivot and the mass centre of the balance.

In this case, the relative torque variation ▱ is of 0%: the friction torques are perfectly equal in θ=0°, 90° and 180°. On the other hand, the friction torque varies for different angles of these 3 values.

The graph of FIG. 13 shows the variation of optimum angles depending on the relative position of the mass centre for this configuration. The two angles are equal and have a value less than or equal to arctan(½)=26.6° approximately. An example of torque variation depending on the orientation θ is represented on the graph of FIG. 14.

Regardless of the selection of the model associated with the system, the minimum contact angles of the two pivots and of the two bearings, verify the following equation: $\cot \alpha_b + \cot \alpha_h \geq \sqrt{12}$.

FIGS. 15 to 17 show other examples of pivots and of cavities meeting the equation mentioned previously, whilst having shapes that are not entirely conical, such as the preceding examples.

Thus, in a first alternative embodiment of FIG. 15, the first pivot 33 has a convex portion 37 and the cavity 35 has a convex portion 38, a section of each portion forming the contact zone 41. The cavity 35 comprises a back 39, then a first flared portion 42 extending from the back 39, the convex portion 38 is connected to the first flared portion 42, and a second flared portion 65 extends from the convex portion 38 up to a cylindrical wall 66 of the cavity 35. The second flared portion 65 is wider than the first 42. The convex portion 38 has a rounded shape oriented towards the inside of the cavity 35.

The pivot 33 has a rounded point 40 at its end, then a convex portion 37 extending from the point 40, and a conical portion 71 extending from the convex portion 37 up to a cylindrical portion 72 of the pivot 33.

The pivot 33 is inserted into the cavity 35, the dimensions of the pivot 33 and of the cavity 35 being such that the convex portion 37 of the pivot 33 is in contact with the convex portion 38 of the cavity 35. The two convex portions 37, 38 in contact define the contact zone 41. Only one section of each convex portion 37, 38 is in contact with one another. The contact zone 41 is created here above the first flared portion 42 to favour a smaller minimum contact angle. The normals of the contact zone 41 around the pivot 33 create a minimum contact angle with the plane perpendicular to the pivot, this minimum angle corresponds to a case meeting the preceding equations according to the invention, for example here of 25°.

For the second variant of FIG. 16, the first pivot 43 has a convex portion 47 and the cavity 45 has a concave portion 48. The cavity 45 comprises a back 49, then a first flared portion 52 extending from the back 49, the concave portion 48 is connected to the first flared portion 52, and a second flared portion 67 extends from the convex portion 48 up to a cylindrical wall 68 of the cavity. The second flared portion 67 is wider than the first 52. The concave portion 48 has a rounded shape oriented towards the outside of the cavity 45.

The pivot 43 comprises a rounded excrescence 50 at its end, a convex portion 47 linked to the excrescence 50 by a flared portion 75, the convex portion 47 being linked to a cylindrical portion 68 of the pivot 43.

The pivot 43 is inserted into the cavity 45, the dimensions of the pivot 43 and of the cavity 45 being such that the convex portion 47 of the pivot 43 is in contact with the concave portion 48 of the cavity 45. The two convex 47 and concave portions 48 in contact define the contact zone 51. Only one section of each convex 47 or concave portion 48 is in contact with one another. The contact zone 51 is created here below the second flared portion 67 to favour a smaller minimum contact angle. The normals of the contact zone 51 around the pivot 43 create a minimum contact angle with the plane perpendicular to the pivot 43, this minimum angle corresponds to a case meeting the preceding equations according to the invention, for example here of 25°.

In the third variant, represented in FIG. 17, the first pivot 53 has a concave portion 57 and the cavity 55 has a convex portion 58, a section of each portion forming the contact zone 61.

The pivot 53 has a concave portion 57 and the cavity 55 has a convex portion 58. The cavity 55 comprises a back 59, then a first cylindrical portion 62 extending from the back 59, the convex portion 58 being connected to the first cylindrical portion 62, and a flared portion 69 extends from the convex portion 58 up to a cylindrical wall 70 of the cavity 55. The convex portion 58 has a rounded shape oriented towards the inside of the cavity 55.

The pivot 53 comprises a rounded end 60, a concave portion 57 linked to the rounded end 60 on the one hand, and to a cylindrical portion 70 of the pivot 53 on the other hand.

The pivot 53 is inserted into the cavity 55, the dimensions of the pivot 53 and of the cavity 55 being such that the concave portion 57 of the pivot 53 is in contact with the convex portion 58 of the cavity 55. The two convex 58 and concave portions 57 in contact define the contact zone 61. Only one section of each convex 58 or concave portion 57 is in contact with one another. The contact zone 61 is created here above the cylindrical portion 62 of the cavity 55 to favour a smaller minimum contact angle. The normals of the contact zone 61 around the pivot 53 create a minimum contact angle with the plane perpendicular to the pivot 53, this minimum angle corresponds to a case meeting the preceding equations according to the invention, for example here of 25°.

Naturally, the invention is not limited to the embodiments described with reference to the figures and variants may be considered without departing from the scope of the invention.

The invention claimed is:

1. A rotary wheel set system of a horological movement, the system comprising:

a rotary wheel set; and a first and a second bearing, for a first and a second pivot of the arbor of the rotary wheel set, wherein the wheel set includes a mass center (G) in a position of its arbor, wherein the first bearing includes an endstone comprising a main body equipped with a conical cavity configured to receive the first pivot of the arbor of the rotary wheel set, wherein the first pivot being capable of cooperating with the cavity of the endstone in order to be able to rotate in the cavity, at least one contact zone between the first pivot and the cavity being generated, and wherein normals of the contact zone form a minimum contact angle ($\alpha_h$) relating to a plane perpendicular to the arbor of the first and second pivots, wherein the minimum contact angle ($\alpha_h$) is less than or equal to 30°.

2. The wheel set system according to claim 1, wherein the second bearing cooperates with the second pivot to enable the rotary wheel set to rotate about its arbor, the second bearing comprising a second cavity, the second pivot being capable of cooperating with the second cavity of the end-stone in order to be able to rotate in the second cavity, at least one second contact zone between the second pivot and the second cavity being generated, the normals of the second contact zone forming a second minimum contact angle ($\alpha_b$) in relation to the plane perpendicular to the arbor of the second pivot, wherein the minimum contact angles ($\alpha_h$,$\alpha_b$) of the two pivots and of the two bearings are defined by the following equation: cot $\alpha_h$+cot $\alpha_b \geq 2.5$.

3. The wheel set system according to claim 1, wherein the second minimum contact angle ($\alpha_b$) is greater than or equal to arctan (½).

4. The wheel set system according to claim 1, wherein the minimum contact angles ($\alpha_h$, $\alpha_b$) are defined by the following equations:

$$\tan\alpha_b = \frac{\overline{BH}}{4\overline{GH}}$$

$$\tan\alpha_h = \frac{\overline{BH}}{4\overline{GB}}$$

$$\frac{R_h}{R_b} = \frac{\mu_b}{\mu_h}\frac{\overline{GH}}{\overline{GB}}$$

where BH is the distance between the ends of the two pivots, GH is the distance between the end of the first pivot in contact with the first bearing and the mass centre (G) of the balance, and GB is the distance between the end of the second pivot in contact with the second bearing and the mass centre (G) of the balance 2.

5. The wheel set system according to claim 1, wherein the minimum contact angles $\alpha_b$, $\alpha_h$) are defined by the following equations:

if GB<GH:

$$\tan\alpha_b = \frac{1}{\frac{2\overline{GH}}{\overline{BH}}\sqrt{\left(1+\frac{2\overline{GH}}{\overline{BH}}\right)\left(1+\frac{2\overline{GB}}{\overline{BH}}\right)}}$$

$$\tan\alpha_h = \frac{1}{\sqrt{\left(1+\frac{2\overline{GH}}{\overline{BH}}\right)\left(1+\frac{2\overline{GB}}{\overline{BH}}\right)}}$$

if GB>GH:

$$\tan\alpha_b = \frac{1}{\sqrt{\left(1+\frac{2\overline{GH}}{\overline{BH}}\right)\left(1+\frac{2\overline{GB}}{\overline{BH}}\right)}}$$

$$\tan\alpha_h = \frac{1}{\frac{2\overline{GB}}{\overline{BH}}\sqrt{\left(1+\frac{2\overline{GH}}{\overline{BH}}\right)\left(1+\frac{2\overline{GB}}{\overline{BH}}\right)}}$$

where BH is the distance between the ends of the two pivots, GH is the distance between the end of the first pivot in contact with the first bearing and the mass centre (G) of the balance, and GB is the distance between the end of the second pivot in contact with the second bearing and the mass centre (G) of the balance.

6. The wheel set system according to claim 1, wherein the contact zone or zones go around the pivot and the cavity about the arbor of the balance.

7. The wheel set system according to claim 1, wherein the first pivot has a conical shape.

8. The wheel set system according to claim 1, wherein the first pivot has a convex portion and the cavity has a concave portion, a section of each portion forming the contact zone.

9. The wheel set system according to claim 1, wherein the first pivot has a concave portion and the cavity has a convex portion, a section of each portion forming the contact zone.

10. The wheel set system according to claim 1, wherein the first pivot has a convex portion and the cavity has a convex portion, a section of each portion forming the contact zone.

11. The wheel set system according to claim 1, wherein the two minimum contact angles ($\alpha_b$,$\alpha_h$) are equal.

12. The wheel set system according to claim 1, wherein the end of the pivot is defined by the intersection between the normal at the contact and the arbor of the pivot.

13. The wheel set system according to claim 1, wherein the pivots have a rounded tip, the rounded tips of the two pivots having identical radii ($R_b$,$R_h$).

14. A horological movement comprising a plate and at least one bridge, said plate and/or the bridge including an orifice, wherein it includes a rotary wheel set system according to claim 1.

15. The wheel set system according to claim 1, wherein the minimum contact angle ($\alpha_h$) is less than or equal to arctan (½).

16. The wheel set system according to claim 2, wherein cot $\alpha_h$+cot $\alpha_b \geq 3$.

17. The wheel set system according to claim 2, wherein cot $\alpha_h$+cot $\alpha_b \geq 4$.

* * * * *